Patented July 13, 1954

2,683,658

UNITED STATES PATENT OFFICE 2,683,658

PLANT NUTRIENT COMPOSITION CONTAINING ZINC AND PROCESS OF PRODUCING THE SAME

Harold F. Saunders, Cleveland, Ohio, and Fredric C. Verduin, Chicago, Ill., assignors to The Sherwin-Williams Company, Cleveland, Ohio, a corporation of Ohio No Drawing. Application March 1, 1951, Serial No. 213,484

12 Claims. (Cl. 71—1)

This invention relates, as indicated, to a composition containing a compound comprising zinc oxide either in chemical combination or as an admixture which is particularly useful for the correction of zinc deficiencies in plants, and which composition will disperse easily and substantially completely in water and exhibit a relatively low settling rate. The particular advantages obtained in the use of this material are a direct result of the manner in which the composition is compounded.

An outstanding development in the field of plant nutrition has been the recognition of the relation between the availability to the plant of certain minor chemical elements and various symptoms observable in the plant growth and the production and quality of the fruit. Plants suffer a number of deficiency diseases due to lack of available zinc, such as "little leaf" or "rosette" of apples, pecans, vines and stone fruit; "mottle leaf" or "frenching" of citrus; "yellows" of walnut; "bronzing" of tung trees and "white bud" of corn. The general plant system, roots, twigs and foliage exhibit certain symptoms now recognizable as due to deficiency of available zinc and both the quality and quantity of the fruit suffer.

The application to the plant of certain zinc compounds, by soil treatment, but preferably by spraying, has been found effective in correcting the symptoms and restoring the plant to productivity.

Sprays used for the correction of zinc deficiency have in the past generally contained zinc sulphate at a concentration of from 3 to 5 lbs. per 100 gallons of spray and neutralized with hydrated lime, or the liquid lime-zinc sulphate, which sprays have been markedly effective in combating this deficiency. The chief objection to the mixture is that it permits an accumulation of lime in the soil with the result that the pH of the soil is increased, a condition which fixes the zinc and renders it unavailable to the plant adsorptive system. Another objection to the lime-zinc sulphate mixture is that it is not compatible with neutral mineral oils, frequently added to such mixture for the simultaneous control of mites and other such pests.

Recently a number of growers have substituted zinc oxide or zinc carbonate for zinc sulphate and thus avoided necessity for the use of lime in the spray formula. A number of grades of zinc oxide and zinc carbonate are available on the market for this purpose and the primary objection to their use is the rapidity with which they settle out in the spray tank, with resulting non-uniformity of the spray or even clogging of the spray nozzles.

It is, therefore, a principal object of this invention to provide a zinc-containing plant nutrient composition, which composition contains no lime and does not require the addition of lime to neutralize, thereby obviating the accumulation of lime in the soil with the resulting deleterious effect on the zinc compound as regards its availability to the plant. Also the increase in the pH of the soil due to accumulation of lime is avoided.

Another object of this invention is to provide a method for compounding a zinc-containing plant nutrient composition which method imparts characteristics to the composition such that there is obtained a high degree of dispersion and a minimum degree of settling of the insoluble material in the spray mix while standing in the spray tank.

Still another object of this invention is to provide a substantially uniform spray composition which will prevent clogging of the lines and spray nozzles by settled material.

Another object of this invention is to provide a zinc-containing composition which is compatible with neutral mineral oils.

Other objects of this invention will appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

It has now been found that the rapid settling rate of zinc oxide and zinc oxide-containing compositions, such as zinc carbonate (considered for the purposes of this invention as $ZnO \cdot CO_2$) and basic zinc carbonate, for example $2(ZnO \cdot CO_2) \cdot 3ZnO \cdot 3H_2O$, may be substantially overcome by fulfilling at least two conditions. First, a clay having water adsorptive properties, such as the montmorillonite clays, e. g. bentonite, and the zinc oxide-containing material must be intimately interspersed. Secondly, a deflocculating agent must be added. Either one of these steps alone applied to the compositions of this invention fails to provide a satisfactory composition. For example, the combination of zinc oxide, or basic zinc carbonate, and bentonite in the proportions herein contemplated, even when thoroughly co-milled, forms a strongly flocculated system in water. The settling characteristics of the zinc oxide are, in fact, intensified in the presence of bentonite, and in the absence of a deflocculating agent contrary to the normal expected effects of bentonite usually considered a superior dispersant. On the other hand, if the bentonite and zinc oxide-containing material are not intimately interspersed in the manner hereinafter more particularly described, or equivalent manner, the settling and suspension characteristics of the spray mix are not substantially improved over the compositions heretofore known in the prior art. When such mixtures are made by the conventional blending methods, upon addition to water the ease of mix is very much reduced and a tendency to form partially wetted agglomerates or blends creates a condition in mixing that is worse than the original material. It has been found, however, that when the mixtures of zinc oxide-containing material and montmorillonite clay are subjected to co-milling preferably in an attrition mill or hammer mill, to completely co-mingle and intersperse the ingredients to an extent not possible by ordinary blending, the product is easily and completely wetted by water and the effectiveness of the deflocculating agent is surprisingly increased. The object of the milling operation is not primarily to effect particle size reduction, but to accomplish an interspersion of the montmorillonite particles and the particles of the zinc-containing material. Considerable work must be done in order to break down the agglomerated particles of both ingredients to approach ultimate discrete particles. Once disrupted, the ultimate particles of the two ingredients must be intermixed before agglomeration can occur. The high speed hammer mills, screen mills, and fluid energy mills provide means for the closest approach to the ideal condition sometimes referred to as an "ultimate mixture."

The zinc-containing compounds useful in accordance with this invention are those which may conveniently be considered as comprising zinc oxide in chemical combination or in admixture with one or more different zinc compounds or lead compounds. Specific examples of zinc-containing materials include zinc oxide, zinc carbonate, leaded zinc oxide, basic zinc carbonate, and basic zinc sulphate, for example, $3ZnO \cdot ZnSO_4 \cdot 3H_2O$. Mixtures of zinc oxide and zinc carbonate, mixtures of zinc oxide and lead sulphates (either co-fumed, chemically reacted, or physically admixed, etc.) may also be used in accordance with this invention. Entirely satisfactory results in settling rate, ease of mix, and pH value have been obtained by the use of a zinc oxide-containing compound comprising a mixture of zinc oxide with lead sulphate or basic lead sulphates, and especially when such leaded zinc oxide is of the co-fumed type. Many other zinc-oxide containing materials of the insoluble type are well known in the art.

A considerable range of the percentage of the zinc oxide material is of course permissible since this factor influences only the quantity of the composition that should be used in the spray tank to obtain a specified weight of zinc per 100 gallons of spray mixture, adjustments of the level of bentonite, deflocculating agent, added extender (if desired) etc. being made to balance. Generally, the amount of active ingredient, i. e., the compound comprising zinc oxide, employed amounts to from about 60% to about 95% by weight of the essential ingredients. Also, as indicated above, the active ingredient need not be a pure zinc compound. The amount of available zinc calculated as the metal is desirably within the range from about 40% to about 80% by weight of the essential ingredients. Where the proportion of the zinc-containing active ingredient is less than 85% by weight of the entire composition, some advantage in ease of mixing is obtained by replacing a portion of the montmorillonite clay with a suitable different solid powdered inert such as kaolinite, diatomaceous earth, or pyrophyllite. The total range of montmorillonite clay should be maintained within approximately the range of from 5% to 30% with the preferred being about 9% montmorillonite clay with about 10% other inert.

As indicated above, the inclusion in the compositions of this invention of a deflocculating agent is of primary importance. The deflocculating agents useful in accordance with this invention are of a special class. Unlike most of the so-called surface active agents or "surfactants" which function through a reduction in surface and interfacial tension, the class of materials applicable to the present invention function by forming a diffuse layer of electrical charges of the same sign on the surface of the particles. This causes the particles to repel each other and thus disperse or defloccuate. This effect is realized to a practical degree only in the large, complex, condensed or "poly" molecules, almost without exception.

Specific examples of deflocculating agents of the large, complex, or condensed molecule type include the alkali metal salts, alkaline earth metal salts, and ammonium salts of various sulphonated lignins and various sulphonated naphthalene-formaldehyde condensates. Sulphonated naphthalene-formaldehyde condensates may be used by reacting sulphonic acid, naphthalene or alkylated naphthalene and formaldehyde, or by reacting naphthalene sulphonic acid with formaldehyde. The resultant sulphonic acid compound may then be neutralized with caustic soda or other alkali or ammonia base such as, for example, calcium oxide, potassium hydroxide, lithium hydroxide, or ammonium hydroxide.

If the alkalinity factor is disregarded, the inorganic polyphosphates may also be used as deflocculating agents. This class includes the pyrophosphates, the tripolyphosphates, and the hexameta phosphates. With the pyrophosphates, even the alkalinity of the resulting composition may be controlled by using amounts of deflocculating agent in the lower portion of the range for this material. Specific examples of deflocculating agents useful in accordance with this invention include, therefore, sodium ligno sulphonate, ammonium ligno sulphonate, calcium ligno sulphonate, sodium naphthalene-formaldehyde sulphonate, potassium naphthalene formaldehyde suphonate, sodium alkyl naphthalene-formaldehyde sulphonate, sodium pyrophosphate, sodium hexameta phosphate, sodium tripolyphosphate.

It is believed that deflocculating agents as a class are distinguishable from wetting agents and dispersing agents. Although some of the compounds mentioned above as useful herein are operative as dispersing agents and as aids for use in conjunction with wetting agents, other wetting agents and dispersants which have been tested for use in accordance with this invention cause extreme foaming and excessive flocculation. A particular class of materials which are not suitable for use in accordance with this invention are the sodium alkyl aryl sulphonates. Experimental tests indicate that the deflocculating action is due to the presence of a plurality of polyvalent mineral non-oxidizing acid radicals in a molecule of higher molecular weight than is usual in the ordinary organic wetting and dispersing agents. The deflocculating agent should be carried at a 2% to 5% by weight concentration with a preferred level being about 3%.

It will be observed, therefore, that broadly stated this invention comprises the provision of a substantially water insoluble, readily and stably water dispersible plant nutrient composition comprising in combination an interspersion of substantially deaggregated particles of a zinc oxide-containing material with substantially deaggregated particles of a montmorillonite clay and a minor amount of a deflocculating agent. More particularly, this invention comprises the provision of such a composition comprising in combination an interspersion from about 92% to about 67% by weight of substantially deaggregated particles of zinc oxide-containing material with from about 5% to about 30% by weight of substantially deaggregated particles of a montmorillonite clay, and from about 2% to about 5% by weight of a deflocculating agent. As has been previously indicated, part of the montmorillonite type clay is desirably replaced, in certain instances, with from about 40% to about 85% by weight of the total amount of clay (montmorillonite plus colloidal clay), of a colloidal clay such as kaolin, china clay, or the like. By the term "interspersed" as used herein and in the appended claims, it is intended that the aggregate particles of zinc oxide and montmorillonite clay are broken down by the application of a considerable amount of work, and the substantially discrete particles inter-mixed before the deaggregated particles have an opportunity to reaggregate.

By the term "substantially deaggregated particles," as used herein and in the appended claims, is meant that the individual particles of the unmilled zinc oxide, for example, or clay, or deflocculating agent, have been either prior to or during the milling operation reduced in size to aggregated particles having a particle size of about 10 microns, and then during the milling operation have been deaggerated to particle sizes which are on the order of about 2 microns or less. Particles having this latter size of about 2 microns or less, for the purposes of this invention, are considered to be discrete or substantially deaggregated particles.

It has been found that interspersion is conveniently achieved in accordance with this invention by co-milling the zinc oxide-containing material and the montmorillonite type clay in a suitable milling machine. As indicated above, interspersion is of critical importance in the process of this invention. Although other means of achieving the interspersion may be found, the use of milling machines of the types hereinafter indicated is probably the most convenient means for obtaining the desired result. These milling machines are not used so much from the point of view of size reduction of essential ingredients which are milled together, but from the standpoint of providing an environment in which opportunity is provided for the collision of particles of the zinc oxide-containing ingredient with particles of the montmorillonite clay ingredient. Although size reduction does aid in the ease of suspension, as subsequent data will demonstrate, this is not the critical function performed by the milling operation. For example, the particle size of the materials introduced into the milling machine may already be of such magnitude that further milling in the same machine of individual components would not result in any substantial reduction of the original particle size. However, the opportunities for attrition provided in such milling operation under the expediture of relatively large amounts of energy, i. e., more than is available in simple tumbling or ball mills, the particles of zinc-containing material are forcefully contacted with particles of the clay ingredient or ingredients. Accordingly, any milling device which is capable of imparting large amounts of energy to the individual particles while maintaining them in a turbulent state in a fluid medium such as air, is useful in the process of this invention. It is while in this state that the individual substantially deaggregated particles are interspersed. Specific examples of such available milling devices include the Mikro pulverizer, the Raymond screen pulverizer, the Mead mill, the Stedman disintegrater, the Schutz-O'Neill limited mill, and the like as well as the various fluid energy mills such as the Micronizer. The foregoing devices are particularly adaptable to the production of the compositions of this invention and are distinguishable from other types of pulverizing mills in that they contain free spaces which permit the contacting of the zinc oxide-containing ingredient and the clay under a high energy potential. In general, these mills will impart energy at the rate from about 3 to about 300 horsepower minutes per pound. For the purposes of this invention, energy need be applied only at the rate from at least about 3 to about 10 horsepower minutes per pound and most desirably from about 4.5 to 6 horsepower minutes per pound. Higher rates of application of energy than indicated may, of course, be employed; however, such excess power is unnecessary under usual circumstances.

Reduction in particle size is, as indicated above, not a primary objective of the milling operation. However, there are limits on particle size in excess of which a stable suspension cannot be obtained regardless of the treatment employed. In general, the compositions of this invention prior to use in the field are dry materials substantially all of which will pass at least a 325 mesh screen, i. e., less than 1% being retained.

Actually, the individual particles average considerably finer than the 44 micron size of a 325 mesh screen, such particles averaging about 2 microns and finer in diameter. Of course, without treatment in accordance with this invention, the particles will agggregate and flocculate in water suspension to relatively large clumps to about 10 to 100 microns in size which will settle out rapidly. If the zinc oxide particles are very large, that is on the order of about 15 microns, the settling forces are too great to overcome.

The function of the deflocculating agent would be expected to be to prevent the mutual coagulation of the bentonite and the zinc oxide, and also to deflocculate the zinc oxide aggregates. The bentonite swells very markedly in water. This swelling, or solvation, produces a particle approaching the density of water and thus reduces the tendency to settle, binds considerable amounts of water, and provides some structure or rigidity to the system. All this interferes with natural tendency of the zinc oxide particles to settle out by providing a physical interference and reduction in fluidity in the suspending medium. However, there is some other unknown phenomenon occurring as a result of the co-milling of the zinc component and the clay component since separately milled subsequently blended ingredients fail to provide desirable settling properties as will be demonstrated hereinafter. It is believed that the major improvements in the ease of suspension and suspension stability are a direct result of impact between discrete particles of the zinc-containing materials and discrete particles of the montmorillonite clay resulting in a coalesced particle.

The following tables show the composition of a number of examples in the dry concentrate form and also give data of a spray mix containing the concentrate. Another table compares the properties of all the examples with respect to settling rate, non-suspended matter and pH.

Reference is had in the following tables to "leaded zinc oxide" which in this case was a co-fumed leaded zinc oxide. A typical or average analysis for a co-fumed leaded zinc oxide of the type used in these tests is as follows:

| | Per cent |
|---|---|
| Zinc oxide | 88 |
| Basic lead sulphates | 10.1 |
| Other compounds native to zinc ores | 1.9 |

It should be noted, however, that in co-fumed pigments all of the components are usually considered as being tied into the molecules or particles and do not necessarily appear as separate entities as would be the case with a simple mixture. Leaded zinc oxides of other ratios of zinc oxide to basic lead sulphate may be used and may be either of the co-fumed type or a mechanical mixture.

Also in the following examples, unless otherwise indicated, the ingredients were blended, such as by tumbling, and then milled. Although the deflocculating agent was blended in these examples prior to the co-milling operation, as will be pointed out in subsequent examples, it is not necessary that the deflocculating agent be blended with the zinc oxide-containing material and the clay prior to milling. It is, however, essential that the zinc-containing material and the montmorillonite clay be interspersed as by co-milling.

TABLE I

*Pounds in mix*

| Ex. No. | Leaded Zinc Oxide | Bentonite | Deflocculating Agent | Colloidal Clay | Zinc Oxide Fine Particle | Zinc Oxide Med. Particle | ZnCO₃ (Basic) |
|---|---|---|---|---|---|---|---|
| 1 | 100 | | | | | | |
| 2 | 100 | | | | | | |
| 3 | 97 | 0 | 3 | | | | |
| 4 | 78 | 22 | 0 | | | | |
| 5 | 92 | 5 | 3 | | | | |
| 6 | 88 | 9 | 3 | | | | |
| 7 | 78 | 19 | 3 | | | | |
| 8 | 78 | 19 | 3 | | | | |
| 9 | 74 | 23 | 3 | | | | |
| 10 | 67 | 30 | 3 | | | | |
| 11 | 78 | 5 | 3 | 14 | | | |
| 12 | 78 | 9 | 3 | 10 | | | |
| 13 | 78 | 0 | 3 | 19 | | | |
| 14 | 74 | 9 | 3 | 14 | | | |
| 15 | 67 | 5 | 3 | 25 | | | |
| 16 | 67 | 0 | 3 | 30 | | | |
| 17 | | 0 | 0 | 0 | 100 | | |
| 18 | | 0 | 3 | 0 | 97 | | |
| 19 | | 9 | 3 | 0 | 88 | | |
| 20 | | 19 | 3 | 0 | 78 | | |
| 21 | | 9 | 3 | 10 | 78 | | |
| 22 | | 16 | 3 | 11 | 70 | | |
| 23 | | 0 | 0 | 0 | | 100 | |
| 24 | | 0 | 3 | 0 | | 97 | |
| 25 | | 33 | 0 | 0 | | 67 | |
| 26 | | 30 | 3 | 0 | | 67 | |
| 27 | | 0 | 0 | 0 | | | 100 |
| 28 | | 5 | 0 | 0 | | | 95 |
| 29 | | 5 | 3 | 0 | | | 92 |
| 30 | | 19 | 3 | 0 | | | 78 |
| 31 | | 7 | 3 | 10 | | | 80 |
| 32 | | 9 | 3 | 10 | | | 78 |

TABLE II
Composition

| Ex. No. | Percent Zn | Percent ZnO | Percent Pb | Percent PbSO₄ | Percent Bentonite | Percent Colloidal Clay | Percent Deflocculating Agent |
|---|---|---|---|---|---|---|---|
| 1 | 71 | 88.0 | | | 0 | 0 | 0 |
| 2 | 71 | 88.0 | | | 0 | 0 | 0 |
| 3 | 69 | 85.4 | 6.8 | 8.3 | 0 | 0 | 0 |
| 4 | 55 | 68.7 | 5.5 | 6.7 | 22 | 0 | 0 |
| 5 | 65 | 81.0 | 6.4 | 7.9 | 5 | 0 | 3 |
| 6 | 62 | 75.0 | 6.2 | 7.6 | 9 | 0 | 3 |
| 7 | 55 | 68.7 | 5.5 | 6.7 | 19 | 0 | 3 |
| 8 | 55 | 68.7 | 5.5 | 6.7 | 19 | 0 | 3 |
| 9 | 52 | 65.1 | 5.2 | 6.4 | 23 | 0 | 3 |
| 10 | 47 | 59.0 | 4.7 | 5.8 | 30 | 0 | 3 |
| 11 | 55 | 68.7 | 5.5 | 6.7 | 5 | 14 | 3 |
| 12 | 55 | 68.7 | 5.5 | 6.7 | 9 | 10 | 3 |
| 13 | 55 | 68.7 | 5.5 | 6.7 | 0 | 19 | 3 |
| 14 | 52 | 65.1 | 5.2 | 6.4 | 9 | 14 | 3 |
| 15 | 47 | 59.0 | 4.7 | 5.8 | 5 | 25 | 3 |
| 16 | 47 | 59.0 | 4.7 | 5.8 | 0 | 30 | 3 |
| 17 | 80 | 99.6 | 0 | 0 | 0 | 0 | 0 |
| 18 | 78 | 96.6 | 0 | 0 | 0 | 0 | 3 |
| 19 | 70 | 88.0 | 0 | 0 | 9 | 0 | 3 |
| 20 | 62 | 75.0 | 0 | 0 | 19 | 0 | 3 |
| 21 | 62 | 75.0 | 0 | 0 | 9 | 10 | 3 |
| 22 | 56 | 70.0 | 0 | 0 | 16 | 11 | 3 |
| 23 | 80 | 99.6 | 0 | 0 | 0 | 0 | 0 |
| 24 | 78 | 96.6 | 0 | 0 | 0 | 0 | 3 |
| 25 | 54 | 67.0 | 0 | 0 | 33 | 0 | 0 |
| 26 | 54 | 67.0 | 0 | 0 | 30 | 0 | 3 |
| 27 | 54.8 | 68.2 | 0 | 0 | 0 | 0 | 0 |
| 28 | 52 | 64.5 | 0 | 0 | 5 | 0 | 0 |
| 29 | 51 | 63.2 | 0 | 0 | 5 | 0 | 3 |
| 30 | 43 | 53.4 | 0 | 0 | 19 | 0 | 3 |
| 31 | 43.8 | 54.6 | 0 | 0 | 7 | 10 | 3 |
| 32 | 43 | 53.4 | 0 | 0 | 9 | 10 | 3 |

TABLE III
Spray mix data

| Ex. No. | Lbs. Mix to Give 1.08 Zn metal/100 Gals. Spray Mix | Zn Metal Level at 1# per 100 Gals. | ZnO Level at 1#/100 Gals. | Total Pb at 1#/100 Gals. |
|---|---|---|---|---|
| 1 | 1.53 | 0.707 | 0.880 | |
| 2 | 1.53 | 0.707 | 0.880 | |
| 3 | 1.57 | 0.686 | 0.854 | 0.068 |
| 4 | 1.96 | 0.551 | 0.687 | 0.055 |
| 5 | 1.66 | 0.650 | 0.810 | 0.064 |
| 6 | 1.74 | 0.622 | 0.750 | 0.062 |
| 7 | 1.96 | 0.551 | 0.687 | 0.055 |
| 8 | 1.96 | 0.551 | 0.687 | 0.055 |
| 9 | 2.06 | 0.523 | 0.651 | 0.052 |
| 10 | 2.28 | 0.474 | 0.590 | 0.047 |
| 11 | 1.96 | 0.551 | 0.687 | 0.055 |
| 12 | 1.96 | 0.551 | 0.687 | 0.055 |
| 13 | 1.96 | 0.551 | 0.687 | 0.055 |
| 14 | 2.06 | 0.523 | 0.651 | 0.052 |
| 15 | 2.28 | 0.474 | 0.590 | 0.047 |
| 16 | 2.28 | 0.474 | 0.590 | 0.047 |
| 17 | | 0.800 | 0.996 | 0.00 |
| 18 | | 0.780 | 0.966 | 0.00 |
| 19 | 1.53 | 0.707 | 0.880 | 0.00 |
| 20 | | 0.62 | 0.750 | 0.00 |
| 21 | | 0.62 | 0.750 | 0.00 |
| 22 | 1.92 | 0.562 | 0.700 | 0.00 |
| 23 | | 0.800 | 0.996 | 0.00 |
| 24 | | 0.78 | 0.966 | 0.00 |
| 25 | | 0.54 | 0.67 | 0.00 |
| 26 | | 0.54 | 0.67 | 0.00 |
| 27 | | 0.548 | 0.682 | 0.00 |
| 28 | | 0.52 | 0.645 | 0.00 |
| 29 | 2.14 | 0.504 | 0.632 | 0.00 |
| 30 | | 0.43 | 0.534 | 0.00 |
| 31 | 2.45 | 0.438 | 0.546 | 0.00 |
| 32 | | 0.43 | 0.534 | 0.00 |

TABLE IV
Properties

| Ex. No. | Settling Rate | Non-Suspended | pH | Remarks |
|---|---|---|---|---|
| 1 | 95 | 50 | 6.8 | Blended only. |
| 2 | 64 | 50 | 6.8 | |
| 3 | 15 | 20 | 7.0 | |
| 4 | 95 | 30 | 7.4 | |
| 5 | 4 | 4 | 7.2 | |
| 6 | 2 | 4 | 7.2 | |
| 7 | 2 | 4 | 7.3 | |
| 8 | 6 | 40 | 7.3 | Bulk blended 4 hr. |
| 9 | 2 | 7 | 7.3 | |
| 10 | 3 | 13 | 7.4 | |
| 11 | 3 | 4 | 7.1 | |
| 12 | 2 | 2 | 7.2 | |
| 13 | 8 | 11 | 7.1 | |
| 14 | 3 | 4 | 7.2 | |
| 15 | 2 | 4 | 7.2 | |
| 16 | 7 | 10 | 7.1 | Blended only. |
| 17 | 95 | 56 | 7.6 | |
| 18 | 24 | 27 | 7.5 | |
| 19 | 2 | 4 | 8.4 | |
| 20 | 2 | 3 | 8.4 | |
| 21 | 8 | 5 | 8.1 | |
| 22 | 1 | 29 | 8.2 | |
| 23 | 95 | 52 | 7.1 | |
| 24 | 18 | 21 | 7.1 | |
| 25 | 95 | 38 | 7.8 | |
| 26 | 4 | 14 | 7.7 | |
| 27 | 95 | 27 | 9.3 | |
| 28 | 95 | 18 | 8.2 | |
| 29 | 6 | 4 | 8.0 | |
| 30 | 6 | 54 | 8.4 | |
| 31 | 6 | 13 | 8.1 | |
| 32 | 3 | 15 | 8.1 | |

The tests reported in Table IV above were carried out following the procedures described below. To determine the settling rate or suspension stability, a liter size Squibb separatory funnel was calibrated in ml. over a range of 20 ml. beginning at the stopcock or narrow end. A ring stand and clamp were arranged so that the funnel could be held in a reproducible and vertical position, and could be rapidly positioned or removed. 1000 ml. of plain tap water at 25° C. or minus 1° C. were placed in the funnel followed by 6.00 gms. of the sample to be tested. The funnel and contents were shaken in a horizontal position, making 100 shakes (forward and back constituting one shake) in 30 seconds plus or minus 1 second through a displacement of approximately six inches. The funnel was immediately placed in the vertical position and the suspension allowed to settle for exactly 5 minutes, at which time the volume of the settled portion was measured.

To determine the total volume of fume or other zinc compound, 6.00 gms. of the milled product (see below) was tested in the same manner adding successive small increments of zinc sulphate until threshold flocculation was obtained. The volume to which material settles in 5 minutes was taken as the total volume.

$$\text{Percent settled} = \frac{S}{T \times P}$$

Where $S$ = volume in ml. of sample
$T$ = total volume of zinc compound
$P$ = percent/100

To determine the ease of suspension or non-suspended matter, a 2.00 gm. sample is transferred to a Squibb funnel containing 1000 ml. of clear tap water at 25° C. plus or minus 1° C., and held in a vertical position. The funnel is immediately inverted through a rotation of 180 degrees and then back, repeating the cycle a total of 5 times and pausing approximately a second between each rotation. The funnel is placed in the vertical position and exactly 45 seconds after discharging the sample into the funnel, a siphon is inserted to within 15 ml. of the bottom of the funnel and the contents withdrawn under slight vacuum and discarded. The remaining 15 ml., containing the undispersed fraction, is discharged through the stopcock into a tared 50 ml. beaker, flushing out any adhering mud by means of a wash bottle. The breaker and contents are dried to a constant weight in an oven at 100° C.

$$\text{Non-suspended matter} = \frac{\text{Gms. residue} \times 100}{2.00}$$

To determine the pH, a 5.00 gm. sample is thoroughly mixed with 45 ml. of distilled water, adjusted to 25° C., and the pH of the resulting mixture determined with a conventional pH meter using a glass electrode. The results tabulated above were determined with a Beckman pH meter model M.

Tables I and II merely show the composition expressed in terms of parts per 100 and give the analysis of the composition. Table III tabulates the amount of the concentrated composition which is required to give a pre-determined amount of zinc, for example in 100 gals. of spray mix, i. e., the concentrate diluted with water to a total volume of 100 gals. Table IV tabulates various comparative data and illustrates the remarkable results obtainable in settling rate and non-suspended matter which are achieved by the compositions of this invention, and also show the value of the preferred method of compounding the concentrate. Example 12 shows a preferred composition in accordance with this invention.

In general, the settling rate should be less than 10, and the non-suspended matter is preferably less than 15. It will be observed from Table IV that remarkable advantages are obtained by co-milling the dry components as compared to even an excessive bulk blending. Note particularly Examples 7 and 8.

It should also be observed that the pH of these compositions is, in the desired instances, within the range of from about 7 to about 8.5, and still more desirably within the range of 7 to 7.4. Thus, for all practical purposes, these compositions are neutral.

It should be pointed out, however, that while the compositions of this invention are preferably on the alkaline side, higher degrees of alkalinity are not harmful and it is the absence of lime from the compositions which is of greater importance than the alkalinity which may or may not be present due to the ingredients of the compositions of this invention.

While the compositions of this invention may be used as formulated in the preceding tables, such as illustrated by Examples 5–7, 9–12, 14–15, 19–21, 26, 30, 32–33, and applied at the rate of 2 lbs. of such concentrate in 100 gals. of spray mix, it is frequently desirable to add additional materials such as fungicides, sulphur, neutral mineral oil, basic copper sulphate (to combat copper dificiency), borax, insecticides, e. g., arsenate of lead, or other compounds containing material for the purpose of combatting other metal deficiency symptoms. For example, the following spray formulations may be used.

EXAMPLE I

|  | Pounds |
|---|---|
| Neutral zinc composition containing 55% zinc calculated as metallic zinc (Example 12 above) | 2 |
| Dinitrocresol | ½ |
| Wettable sulphur | 10 |
| Water, to make 100 gallons. | |

EXAMPLE II

|  | Pounds |
|---|---|
| Neutral zinc composition containing 55% zinc calculated as metallic zinc (Example 14 above) | 2 |
| Tri-basic copper sulphate | 2 |
| Borax | .5 |
| Arsenate of lead | 2 |
| Wettable sulphur | 10 |
| Water, to make 100 gallons. | |

With respect to the clay ingredients of the compositions of this invention, it has been found essential to include in the composition at least one clay having a fundamental crystal structure of montmorillonite. Specific examples of such clays include fuller's earth and bentonite or wilkeite. The particular crystal structure of montmorillonite exhibits base exchange properties and is capable of adsorbing various cations. In the case of bentonite the principal adsorbed ion is sodium, while with fuller's earth it is calcium. It has been found that part of the montmorillonite type clay may be replaced with a colloidal clay such as kaolin or china clay, such replacement in most cases resulting in an improved ease of suspension with very little change in the settling rate. For example, comparison should be made between Examples 10 and 15, 12 and 19, and 13 and 22 for evidence of this trend. It is interesting to note that while a montmorillonite clay alone will give an excellent dispersion, when a blend of montmorillonite and either zinc oxide (including co-fumed leaded-zinc oxide) or basic zinc carbonate is suspended in water, a strongly flocculated system results. However, if a deflocculating agent such as a lignosulphonate or a condensation product of napthalene sulphonate and formaldehyde is included, a more stable suspension results than if the montmorillonite clay is omitted and only the zinc component and deflocculating agent are employed.

The addition of 5% bentonite or other such clay is sufficient to produce a very substantial increase in suspension stability, and no further improvement occurs beyond 9 to 10% bentonite. Above 15-20% bentonite, the ease of suspension drops off rapidly, and if more than this amount of bentonite is to be used, improvement in the ease of mixing obtains from the substitution of an inert colloidal clay such as kaolin for a portion of the bentonite.

In order to emphasize the importance of milling in the preparation of the neutral zinc compositions of this invention, a special series of blends was prepared according to the following formula:

*Ingredients*

| | Percent |
|---|---|
| (1) Co-fumed leaded-zinc oxide | 78 |
| (2) Bentonite | 19 |
| (3) Sodium ligno sulphonate | 3 |

Various combinations of non-milled, separately milled and co-milled ingredients were used to prepare the several samples. The grinding of the separately milled and co-milled ingredients was conducted exactly as for a complete composition, using a Mikro pulverizer at 14,000 R. P. M. with an 0.013 inch herringbone screen. Co-milled ingredients were, of course, first adequately blended. Final blending to formula of the various ingredients was done in 50 gram batches, weighed into ½ pint containers, and thoroughly rolled and tumbled for 5 minutes.

In the special case of blend F, the required amount of a previously swelled 20% sample of bentonite was first dispersed in the 1,000 ml. of water, and the co-milled leaded-zinc oxide and deflocculating agent then added and the test conducted.

TABLE V

| Blend | Milled Ingredients | | Non-milled Ingred. | Percent Settled | Percent Non-Suspended |
|---|---|---|---|---|---|
| | Separately | Co-milled | | | |
| A | 1, 2, 3 | | | 17 | 39 |
| B | 3 | | 1, 2 | 22 | 22 |
| C | 1, 3 | | 2 | 20 | 48 |
| D | 2 | 1, 3 | | 11 | 32 |
| E | 3 | 1, 2 | | 3 | 2 |
| F | *2 | 1, 3 | | 17 | 10 |
| G | | 1, 2, 3 | | 2 | 4 |

*Predispersed.

In the foregoing table the separately milled ingredients were individually run through the Mikro pulverizer, and then the separately milled ingredients were thoroughly blended together. The co-milled ingredients were first adequately mixed together and the combination put through the Mikro pulverizer. For example, in run D, ingredients 1 and 3 were adequately mixed together and then introduced into the milling machine together. Ingredient 2 was separately milled, and then the mill samples were blended, such as by tumbling the milled ingredients in a jar. Example E demonstrates the unusual effect obtained by co-milling the zinc compound and the montmorillonite clay and then blending with the separately milled deflocculating agent. This is, therefore, a preferred manner of compounding the ingredients. It is of interest to note that the reversal of components 2 and 3 in this preferred procedure produce markedly different results in the percentage settled and the percentage of non-suspended matter. Example G illustrates that if all the ingredients are adequately mixed and co-milled, the results are not substantially different from those shown in Example E.

Another batch was prepared according to the standard formula (78% leaded-zinc oxide) replacing the bentonite with fuller's earth and using the method of Example E. The results obtained in this case were as follows:

| Percent Settled | Percent Non-Suspended | pH |
|---|---|---|
| 7 | 4 | 7.12 |

The importance of milling is well emphasized by the special blending trials outlined above. It is in no way a matter of particle size reduction. The function of the mill appears to be that of thoroughly interspersing and possibly coalescing the particles of leaded-zinc oxide, or zinc oxide and bentonite. Neither good suspension stability nor ease of mixing can be achieved by blending alone. While it is not practical to do so, the deflocculating agent may be blended in after milling with equal results.

Other modes of applying the principle of this invention may be employed instead of those specifically set forth above, changes being made as regards the details herein disclosed, provided the elements set forth in any of the following claims, or the equivalent of such be employed.

One other such mode of application of the principles of this invention is in the formulation of various coating compositions and particularly those comprising stable dispersions of pigmentary materials in an aqueous medium, i. e., coating compositions of the emulsion type.

We, therefore, particularly point out and distinctly claim as our invention:

1. The method of making a zinc-containing composition suitable for use as a plant nutrient composition which comprises the steps of blending a zinc oxide-containing material with a montmorillonite clay, co-milling said blend to produce an interspersion of substantially deaggregated particles of said zinc oxide-containing material and said montmorillonite clay, and introducing a minor amount of a deflocculating agent, whereby a substantially water-insoluble, readily and stably water dispersible composition is produced.

2. A method in accordance with claim 1 in which the zinc oxide-containing material is a leaded-zinc oxide.

3. A method in accordance with claim 1 in which the zinc oxide-containing material is a co-fumed leaded-zinc oxide.

4. A method in accordance with claim 1 in which the zinc oxide-containing material is a basic zinc carbonate.

5. A method in accordance with claim 1 in which the zinc oxide-containing material is $2(ZnO \cdot CO_2) \cdot 3ZnO \cdot 3H_2O$.

6. A method in accordance with claim 1 in which the zinc oxide-containing material is substantially pure zinc oxide.

7. A method in accordance with claim 1 in which the montmorillonite clay is bentonite.

8. A method in accordance with claim 1 in which the deflocculating agent is an alkali metal ligno-sulphonate.

9. A method in accordance with claim 1 in which the deflocculating agent is an alkali metal sulphonate of the condensation product of naphthalene and formaldehyde.

10. The product produced in accordance with claim 1.

11. The method of making a zinc-containing composition suitable for use as a plant nutrient composition which comprises the steps of blending about 78 parts by weight of co-fumed leaded zinc oxide with about 9 parts by weight of bentonite and about 10 parts by weight of kaolinitic clay, co-milling said blend to produce an interspersion of substantially deaggregated particles of said leaded zinc oxide, said bentonite and said clay, and introducing about 3 parts by weight of a sodium ligno-sulphonate, whereby a substantially water-insoluble, readily and stably water dispersible composition is produced.

12. The product produced in accordance with claim 3.

References Cited in the file of this patent

UNITED STATES PATENTS

| Number | Name | Date |
|---|---|---|
| 578,862 | Danforth | Mar. 16, 1897 |
| 624,617 | Braddock | May 9, 1899 |
| 2,056,924 | Kalber | Oct. 6, 1936 |
| 2,237,045 | Booth et al. | Apr. 1, 1941 |
| 2,277,744 | Cupery et al. | Mar. 31, 1942 |
| 2,368,275 | Torley | Jan. 30, 1945 |

FOREIGN PATENTS

| Number | Country | Date |
|---|---|---|
| 493,148 | Great Britain | Oct. 4, 1938 |